Feb. 8, 1949.  H. W. KLINE  2,461,286

RADIO FREQUENCY BRIDGE

Filed June 10, 1946

Inventor:
Halsey W. Kline,
by Prowell P. Mack
His Attorney.

Patented Feb. 8, 1949

2,461,286

UNITED STATES PATENT OFFICE 2,461,286

RADIO-FREQUENCY BRIDGE

Halsey W. Kline, Schenectady, N. Y., assignor to General Electric Company, a corporation of New York Application June 10, 1946, Serial No. 675,563

5 Claims. (Cl. 175—183)

My invention relates to apparatus primarily for obtaining radio frequency measurements, such for example as the radio frequency resistance, capacity and Q of circuit elements, such as coils and condensers, and its object is to provide simple, low-cost apparatus for quickly making such measurements with high accuracy. In carrying my invention into effect, I make use of a bridge circuit especially designed for stable and consistent measurement operations when used at high frequencies. The features of my invention which are believed to be novel and patentable will be pointed out in the claims appended hereto.

Figure 1:
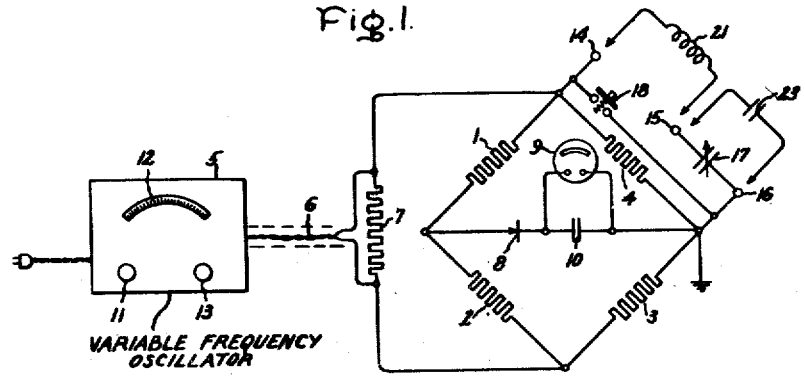
Figure 2:
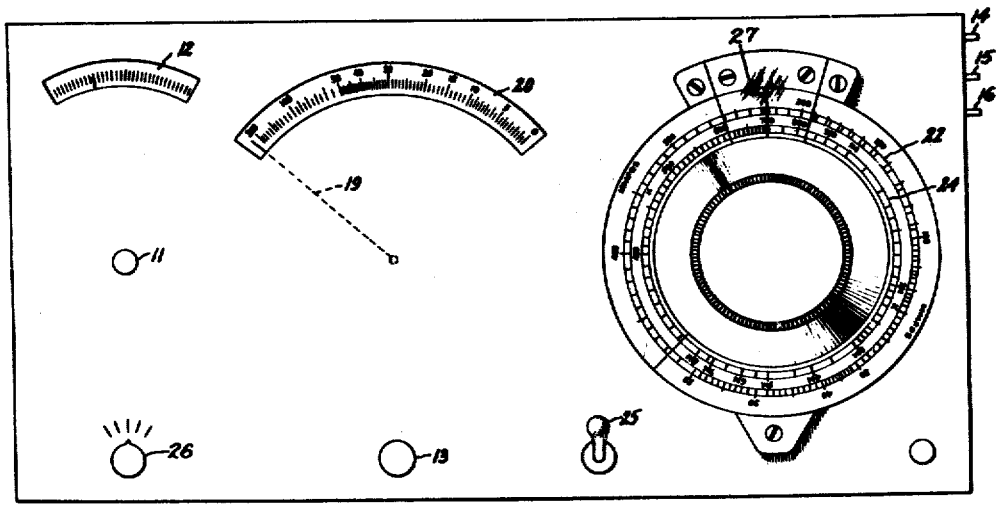

For a better understanding of my invention reference is made in the following description to the accompanying drawing in which Fig. 1 represents a wiring diagram of my radio frequency bridge circuit, as supplied from an oscillator, and Fig. 2 is a front view of a cabinet for conveniently housing the apparatus of Fig. 1.

It is well known that when an ordinary Wheatstone bridge is operated as a high impedance device, its operation at radio frequency is very unstable and erratic, and unsuitable for measurement purposes. I have discovered that if a Wheatstone bridge is constructed of such low impedance that it constitutes a substantial termination on the end of a transmission line, the characteristic impedance of which is of the order of 100 ohms, the bridge becomes a highly stable device and can be used to produce consistent and reliable measurement results at radio frequencies. I make use of this discovery to provide a simple, low-cost, easy to use, high accuracy, high frequency measurement bridge by means of which the radio frequency resistance of coils and capacitors, for example, may be measured directly.

Referring now to Fig. 1, I have represented a Wheatstone bridge having the four resistance arms 1, 2, 3, and 4. These resistance arms are of low resistance as compared to resistances generally used in Wheatstone measurement bridges and may, for example, have equal resistances of 150 ohms each. The upper and lower opposite resupply terminals of the bridge are shown connected to be supplied at radio frequency from a suitable source of supply, such as an oscillator designated 5 through a shielded twisted twin conductor cable or transmission line 6. Also connected across the supply terminals of the bridge and across the bridge end of the transmission line is a resistance 7. This bridge network has an impedance as low as or lower than the surge impedance of the line 6. For instance, if the line has a surge impedance of 60 ohms, the resistance 7 may have 100 ohms. The bridge network thus has a combined resistance of 60 ohms. Thus the bridge network terminates the line and the bridge is extremely stable when the bridge is supplied at high frequency. The resistance 7 across the input terminals is not essential if the bridge arms themselves have the necessary low resistance values as to terminate the line 6. The bridge is preferably grounded as shown. All of the resistances mentioned are of a type for operating on high frequency with negligible inductive or capacitance effects.

The voltage appearing across the other opposite or measurement terminals of the bridge is rectified by a crystal rectifier 8 and applied to a sensitive direct current microammeter 9. A small, smoothing capacitor 10 is preferably connected across the terminals of instrument 9. The oscillator 5 will preferably have a control indicated at 11 in Fig. 1 for varying the frequency and a frequency dial, the scale of which is indicated at 12, by means of which the frequency may be indicated. An oscillator capable of producing frequencies from 50 kilocycles to 80 megacycles will cover the measurement range most likely to be used. The oscillator will also have an amplitude control indicated at 13.

In using the bridge for radio frequency measurements of such things as coils and condensers, I provide test terminals 14, 15 and 16 associated with one arm of the bridge which I designate the test arm. The bridge system also includes a suitable variable condenser 17 permanently connected between test terminals 15 and 16. A normally open push button switch 18 is provided for short circuiting the test arm of the bridge for purposes to be described. Assume now that the bridge is energized from the oscillator at some radio frequency to be used for testing. It will be evident that with the bridge circuit connected as shown and no apparatus to be tested connected across the test terminals, the bridge will be balanced or substantially balanced, since the permanent bridge arms have similar resistances. However, it should be pointed out that in view of the way the bridge is calibrated and used, exact balance under the conditions just mentioned is not essential. In any event, zero or negligible current will flow in the rectifier instrument 8—9 under these conditions, and hence, the pointer 19 (see Fig. 2) of such instrument will be at or very close to the left-hand end of its scale 20. The bridge is prepared for use by closing push button 18. This short circuits test arm 4 and is the equivalent of connecting a test element across test terminals 14—16 having zero radio frequency resistance, and corresponds to maximum unbalance of the bridge, and results in a large deflection of instrument 9. The amplitude control of the oscillator is now adjusted until the deflection of instrument 9 is at the right-hand end of its scale. This position of the pointer is marked zero on the scale and corresponds not only to a test sample of zero radio frequency resistance but also to a certain definite radio frequency voltage impressed on the bridge circuit which is always easily re-established in the manner just explained. The scale 20 of instrument 9 may be calibrated in R. F. ohms by connecting a standard radio frequency decade, calibrated resistance across terminals 14 and 16, and with switch 18 open the resistance is varied and the resistance values marked on the scale. In this calibration the frequency used should be within the range specified as accurate by the manufacturer of the calibrating resistance used. The resistance scale thus obtained will have its zero at the right and increasingly higher values of resistance to the left. The scale values will approach infinity at the extreme left of the scale where the bridge is balanced or substantially balanced. This crowds the upper left end of the resistance scale for the higher values of resistance, which is a desirable feature, as it leaves the scale open and nicely divided for the lower order of resistance values at the right thereon. An appropriate scale marking is from zero to 200 radio frequency ohms as indicated in Fig. 2.

With the bridge circuit thus calibrated, the R. F. resistance of a coil is measured by connecting the coil (coil 21, Fig. 1, for example) to the test terminals 14 and 15. Capacitor 17 is then adjusted until maximum deflection of pointer 19 is obtained. By this is meant nearest approach to the right zero of the scale 20. This indicates a condition of resonance of the circuit 21—17 in which the capacitive reactance of 17 is equal to the inductive reactance of the coil and they, in effect, cancel leaving only the R. F. resistance of the coil effectively connected across the bridge test arm 4. The pointer deflection thus obtained gives the R. F. resistance of the coil. The operation is smooth, reliable, and highly stable and repeatable. The capacitor 17 as well as all other bridge elements and the oscillator 5 are preferably mounted in the cabinet, Fig. 2, and the capacitor 17 is calibrated and its capacity at any adjustment is indicated on a micromicrofarad scale 22. Hence, the capacitance necessary to equalize the inductance of coil 21 is directly indicated on scale 22 for the condition of resonance obtained when measuring the R. F. resistance of such coil. The test frequency is also indicated on the frequency dial 12 of the oscillator.

To measure the capacitance and resistance of a capacitor, for example, the capacitor 23, Fig. 1, a coil of suitable inductive reactance is first connected across test terminals 14—15. Capacitor 17 is adjusted to tune for resonance. The R. F. resistance of this circuit, designated $R_1$, is then obtained from scale 20 and the resonating capacity, designated $C_1$, from scale 22 of the capacitor dial. The capacitor to be measured is then connected across terminals 15—16 in parallel with capacitor 17. Capacitor 17 is again adjusted to obtain a resonant condition and its value is designated $C_2$. Thus we reduce the capacitance of 17 from $C_1$ to $C_2$ by an amount equal to the value added by connecting in capacitor 23. Hence, the capacitance value of capacitor 23 is the difference between the two readings of capacitor 17 on scale 22 or $C_1-C_2$. A new reading of instrument 9 is also obtained when capacitor 23 is connected in and resonated, which value I will designate $R_2$ and is the effective value of R. F. resistance of the test circuit as thus connected. The effective R. F. resistance of capacitor 23, designated $R_3$, may now be calculated as follows:

$$R_3 = \frac{C_1(R_2-R_1)}{C_1-C_2}$$

The power factor of condenser 23 is $$2\pi f R_3(C_1-C_2)$$

where $f$ is the known test frequency used.

The factor of merit of circuit elements for use in high frequency circuits is referred to as Q.

$$Q=\frac{X}{R} \qquad (1)$$

Where

X=either the inductive or capacitive reactance in a resonant circuit in ohms.
R=effective resistance of the resonant circuit in ohms.

My instrument contains a calibrated capacitor so it is more convenient to use resonant capacitive reactance.

$$X_c = \frac{1}{WC} \qquad (2)$$

Where
$X_c$=capacitive reactance in ohms.
$W=2\pi f$.
C=farads.

Therefore, from (1) and (2)

$$Q=\frac{\frac{1}{WC}}{R}=\frac{1}{WC}\times\frac{1}{R}=\frac{1}{2\pi C}\times\frac{1}{fR} \qquad (3)$$

To facilitate rapid mental computations of Q and other pertinent characteristics, a scale 24 is provided below the capacitance scale 22 marked in units of a constant $$K=\frac{1}{2\pi C}=\frac{1}{6.28C}$$

where C is the adjacent correlated value on the capacitance scale 22. Thus we may write Equation 3 thus:

$$Q=K\times\frac{1}{fR}=\frac{1}{fR}$$

For convenience in using and to avoid large numbers the C scale 22 is micromicrofarads and the K scale 24 is in values of $$\frac{1}{1,000,000}K$$

The apparatus then give direct readings of R. F. resistance in ohms on scale 20 of instrument 9, resonant capacity C in micromicrofarads on scale 22, the corresponding value of K on scale 24, and frequency $f$ on the oscillator dial 12. These four values make possible the simple computation of all characteristics of the test circuit elements of which the following are the most important, particularly as regards coils:

$$Q=\frac{K}{fR},\ X=\frac{K}{f},\ L=\frac{25300}{f^2 C},\ Z=\frac{KQ}{f},\ PF_s=\frac{fR}{K},$$

$$PF_c=6.28fR_3(C_1-C_2)10^{-6}$$

where $Q$ = factor of merit $f$ = frequency in megacycles/sec.

$R$ = R. F. resistance in ohms $C$ = capacity in micromicrofarads $K$ = constant indicated $L$ = inductance in microhenries $Z$ = tuned parallel impedance in ohms $X$ = inductive reactance in ohms $PF_s$ = power factor for coils (decimally)

$PF_c$ = power factor for capacitors (decimally)

$R_3$ = resistance of sample capacitor = $\frac{C_1(R_2-R_1)}{C_1-C_2}$ ohms.

The radio frequency load on the oscillator is less than 0.5 watt. No tubes are used in the measuring circuit and there are no thermocouples to burn out. The design of this radio frequency measuring apparatus is more economical, more stable, more rugged, and far more accurate than most conventional Q meters heretofore available.

Not previously mentioned are a frequency band selector 26 and a power switch 25 for the oscillator. The oscillator may be supplied from a 110-volt, 60-cycle circuit. The two scales 22 and 24 of Fig. 2 rotate as a unit with respect to a stationary reference mark 27.

It has been generally known that using prior measuring equipment for making such measurements as are here contemplated, the most difficult measurement to make was on standard fused quartz samples. With my equipment such measurements are readily made with good accuracy. Substituting a standard fused quartz sample for the unknown capacitance 23, Fig. 1, I have obtained the following measurements:

$R_1$ = 14. ohms      $C_1$ = 87. mmfds.
$R_2$ = 14.5 ohms      $C_2$ = 31.2 mmfds.
                        $C_3 = C_1 - C_2$ = 56.8 mmfds.

$$R_3=\frac{C_1(R_2-R_1)}{C_1-C_2}=.765\ \text{ohm}.$$

$$PF_C = WC_3(R_2-R_1) = 6.28 \times 10^6 \times 56.8 \times 10^{-12} \times .765$$
$$= .000273$$

Thus, the standard fused quartz sample as measured by my apparatus has a capacity of 56.8 micromicrofarads, an R. F. resistance of .765 ohm, and a power factor of .000273, which measurements agree very well with the most precise and much more expensive measuring equipment heretofore available.

While R. F. (radio frequency) measurements have been emphasized, the apparatus described may be used for similar measurements at much lower frequencies. Most bridges balance by the so-called "null-balance" method. The null-balance is broad requiring amplification where higher accuracy is desired. This bridge operates on the unbalance principle where high sensitivity is immediately obtained, without amplification.

What I claim as new and desire to secure by Letters Patent of the United States is:

1. Radio frequency measuring apparatus comprising a four arm resistance bridge having opposite input terminals, a line for supplying said bridge at radio frequency connected across said input terminals, a resistor connected across the bridge terminals of said line, said bridge having arms of substantially equal resistance and the combined impedance of the bridge and resistor being not greater than the surge impedance of said line when supplied at radio frequency, a rectifier instrument connected across the other opposite terminals of said four-arm bridge, a circuit changer for short circuiting one arm of said bridge, a pair of test terminals connected to the ends of said last-mentioned bridge arm and a calibrated variable capacitor connected between one of said test terminals and a third test terminal.

2. A radio frequency measurement apparatus comprising a bridge having four arms each of substantially equal resistance of the order of 150 ohms, supply terminals at one pair of opposite terminals of said bridge, a line connected across said terminals for supplying the bridge with radio frequency voltage, a resistor connected across the bridge end of said line, and having such value that the combined impedance of the resistances connected across the bridge end of the line is not greater than the surge impedance of such line when supplied at the radio frequency used for measurement purposes, a rectifier instrument connected across the other opposite terminals of said bridge, a circuit changer for short circuiting one arm of said bridge, a calibrated variable capacitor connected to one end of said last-mentioned arm, and means for connecting a coil to be measured between said variable capacitor and the other end of said last-mentioned arm.

3. Radio frequency measuring apparatus comprising a high frequency line for supplying radio frequency voltages for measurement purposes, impedance means supplied by said line, said means having a value of impedance not greater than the surge impedance of such line as thus connected and including a four-arm resistance bridge, opposite corners of which are connected across said line, said bridge arms being of substantially equal resistance, a direct current rectifier instrument connected across the remaining opposite corners of said bridge, a circuit changer whereby one arm of said bridge may be short circuited, a calibrated adjustable tuning capacitor and terminals for connecting said capacitor in series with apparatus to be tested across said last-mentioned arm of said bridge.

4. High frequency testing apparatus comprising an adjustable frequency, adjustable voltage radio frequency oscillator, impedance means connected to be supplied from said oscillator by a high frequency transmission line, said impedance having such value that when thus connected it terminates the line when the impedance is being supplied thereby from the oscillator, said impedance including a four-arm resistance bridge having opposite corners connected to said line, the four arms of said bridge having substantially equal values of resistance, a direct current rectifier instrument connected across the remaining opposite corners of said bridge, a circuit changer for short circuiting one arm of said bridge, a variable capacitance, terminals connected to said bridge and variable capacitance whereby apparatus to be tested may be connected across said last-mentioned arm of said bridge in series with said capacitance or in parallel with said capacitance, said variable capacitance having a graduated scale with means for indicating the capacitance values designated C at different adjustments, and means for simultaneously indicating corresponding values of $$\frac{1}{2\pi f C}$$

where $f$ is the frequency supplied by the oscillator.

5. High sensitivity radio frequency measuring apparatus comprising a four-arm bridge, the arms of said bridge being similar and each arm consisting solely of a fixed substantially pure resistance such that the bridge has negligible capacitance or inductive effects, terminals for supplying one pair of opposite corners of said bridge with radio frequency voltage, a rectifier instrument and terminals connecting said rectifier instrument directly across the other pair of opposite corners of said bridge, a variable tuning capacitor connected at one end to one end of a bridge arm, terminals at the other end of said capacitor and bridge arm for connecting the condenser in a test circuit and the test circuit and condenser in series across said bridge arm and to open and close said test circuit, said bridge being balanced such that negligible current flows in the rectifier instrument when the bridge is energized and the test circuit is open, said bridge having a calibrated measurement sensitivity corresponding to a full-scale deflection of said rectifier instrument when the test circuit is closed and the radio frequency resistance of the test circuit including said tuning capacitor is zero.

HALSEY W. KLINE.

REFERENCES CITED

The following references are of record in the file of this patent:

UNITED STATES PATENTS

| Number | Name | Date |
|---|---|---|
| 1,665,397 | Wunsch | Apr. 10, 1928 |
| 2,337,759 | Loughlin | Dec. 28, 1943 |

OTHER REFERENCES

Hague: A. C. Bridge Methods; Pitman Publishing Co., New York city, fourth edition, 1938, pp. 232–235 and 338–340.

Radio News, September 1944, pp. 40–42, 87, 88 and 90.